United States Patent [19]
Johnson et al.

[11] Patent Number: 4,798,430
[45] Date of Patent: Jan. 17, 1989

[54] LIGHTWAVE GUIDE CONNECTOR WITH RELEASE LEVERS

[75] Inventors: Alfred H. Johnson, Poughkeepsie, N.Y.; Peter Pohl, Krailling, Fed. Rep. of Germany; Heinz Prauer; Dietmar Schulz, both of Munich, Fed. Rep. of Germany

[73] Assignees: Siemens AG, Berlin and Munich, Fed. Rep. of Germany; IBM, Armonk, N.Y.

[21] Appl. No.: 58,974

[22] Filed: Jun. 8, 1987

[51] Int. Cl.$^4$ .............................................. G02B 6/36
[52] U.S. Cl. .................................................. 350/96.20
[58] Field of Search ................ 350/96.20, 96.21, 96.22

[56] References Cited

U.S. PATENT DOCUMENTS

| | | | |
|---|---|---|---|
| 4,167,303 | 9/1979 | Bowen et al. | 350/96.21 |
| 4,611,887 | 9/1986 | Glover et al. | 350/96.21 |
| 4,679,895 | 7/1987 | Huber | 350/96.2 |
| 4,687,291 | 8/1987 | Stape et al. | 350/96.21 |
| 4,690,494 | 9/1987 | Hirose et al. | 350/96.2 |
| 4,721,356 | 1/1988 | Soster et al. | 350/96.20 |
| 4,721,358 | 1/1988 | Faber et al. | 350/96.21 |
| 4,747,656 | 5/1988 | Miyahara et al. | 350/96.20 |

FOREIGN PATENT DOCUMENTS

| | | | |
|---|---|---|---|
| 0177937 | 4/1986 | European Pat. Off. | 350/96.2 |
| 2939231 | 4/1981 | Fed. Rep. of Germany . | |
| 61-99111 | 5/1986 | Japan | 350/96.22 |

*Primary Examiner*—John D. Lee
*Attorney, Agent, or Firm*—Jeffrey P. Morris

[57] ABSTRACT

A connector for lightwave guides with release levers attached at the narrow sides thereof, which, when lateral pressure is applied, actuate detents. Simultaneously at the narrow sides of the connector casing recesses are provided for the release levers such that the release levers do not rise more than a small amount above the edge of the recess; whereby, the connector can be pulled by manual actuation of the release lever through the recess.

1 Claim, 2 Drawing Sheets

LIGHTWAVE GUIDE CONNECTOR WITH RELEASE LEVERS

CROSS REFERENCE TO RELATE APPLICATION

Dietmar Schulz, et al, Ser. No. 005,053 filed Jan. 20, 1987, Light-wave Guide Plug Connection (U.S. Pat. No. 4,715,674).

BACKGROUND OF THE INVENTION

1. Field of the Invention

The present invention relates to a connector for lightwave guides, having attached at the narrow sides of the connector casing release levers which actuate spring-loaded detents which are released from the locking plate when lateral pressure is applied on the release levers and are engaged in plugged position in counterparts when the connector is connected.

2. Description of the Prior Art

A known connector for lightwave guides is known from German patent DE-OS No. 29 39 231. In the aforementioned German patent, the counterpart, an object may get caught between the release lever and the connector casing and thus block the release lever. This risk is particularly prevalent when the connector, together with several other connectors, is located at a wall covered with shelves and the cables of adjacent connectors can easily enter between the wall of the casing and the release lever.

With such prior art connectors, it is also possible for cables accidentally to press onto the release lever laterally and unlock the release lug of at least one side. Furthermore, it is also possible for a cable to get caught between the casing and the release lever and bend the release lever toward the outside.

It is therefore the primary object of the present invention to provide a connector that prevents the blocking or accidental actuation of the release lever, and also can be disengaged manually if necessary, and further, that the release lever cannot be bent outward.

SUMMARY OF THE INVENTION

In accordance with the present invention, the narrow sides of the connector casing are provided with recesses, the actuating area of the release lever is located recessed inside the recess, and the release lever does not rise much above the edge of the recess when the lever is in an engaged position, so that manual actuation is possible through the recess when the connector is pulled.

One embodiment of the invention provides that the recesses at the narrow sides of the connector casing extend to the lower broad side of the connector casing.

A further embodiment provides that a boundary element is provided which limits the path of movement of the release lever toward the outside and that the rear end of the release lever fits closely when the lever is in a disengaged condition. Further objects and advantages of the present invention are described with reference to the drawings, wherein:

DESCRIPTION OF THE PREFERRED EMBODIMENT

Figure 1:
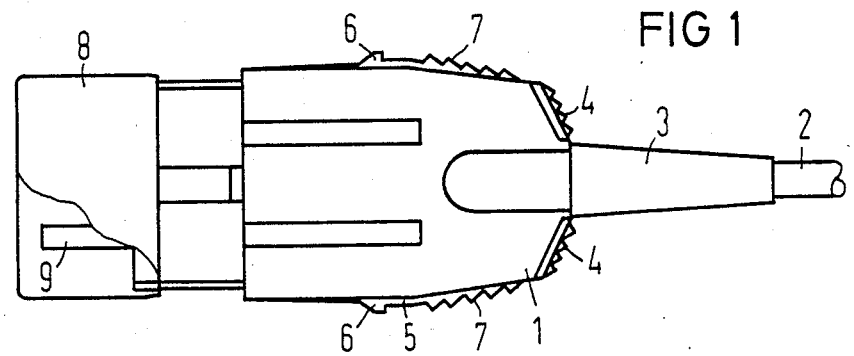
FIG. 1 shows a top view of the connector according to the present invention.

The connector shown in FIG. 1 has a casing with an outer casing edge 1. A lightwave guide 2 enters the back panel of the casing. An anti-buckling bush 3 prevents the bending radius of the lightwave guide 2 from being too tight. In order to better lock the connector casing into a counterpart, two ribbed gripping areas 4 are provided at the back panel which is directed toward the lightwave guide 2. At the front end of the connector is a covering cap 8 for the pins 9 affixed thereunder. In order to release the connection, the release levers 5 are pushed toward the inside, whereupon the detents 6 recede behind the contours of the outer casing edge 1, and the connector can be removed. In order to prevent the connector from slipping when being pulled, the release lever 5 is provided with a ribbed actuating area 7.

Figure 2:
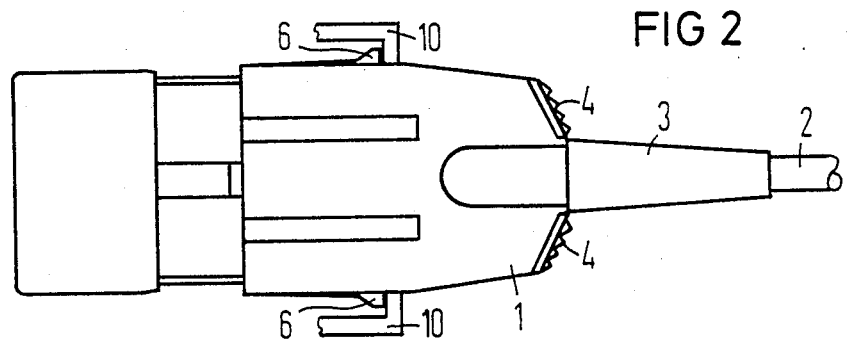
FIG. 2 shows the connector in an engaged position.

FIG. 2 shows the connector in an engaged position. In addition, there are two locking plates 10 located in the counterpart of the plug-in connection, which are merely indicated. The plates 10 are so dimensioned that they push the release levers 5 slightly toward the inside, and the actuating areas 7 thus disappear behind the contours of the outer edges of the connector. This configuration prevents the accidental unlocking of the release levers 5 which might be caused by objects attached adjacent to the connector.

Figure 3:
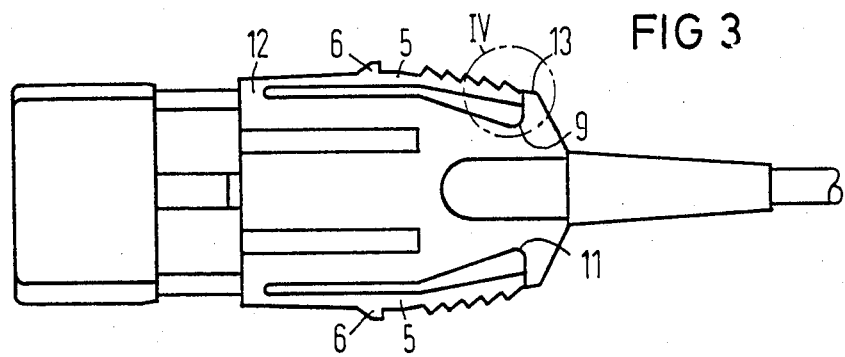
FIG. 3 shows a bottom view of the connector.

FIG. 3 is a bottom view of the connector shown in FIG. 1. At the underside are provided recesses 11 for the path of movement of the release levers 5. As described in this embodiment, the release lever 5, corresponding to a connecting area 12, is attached spring-loaded. In addition, the attachment is so designed that the release lever 5 is preloaded and touches the boundary element 13 while in rest position.

Figure 4:
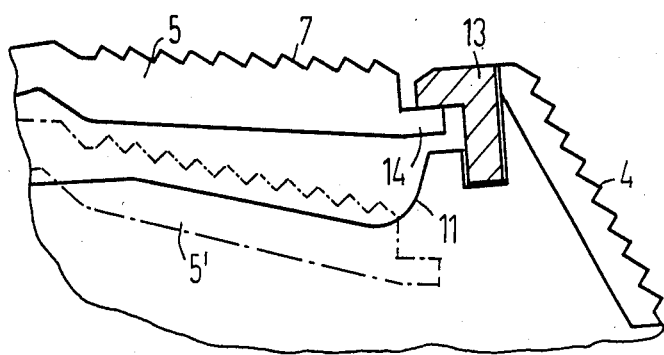
FIG. 4 shows an enlargement of the actuating area of the release lever shown in FIG. 2.
Figure 5:
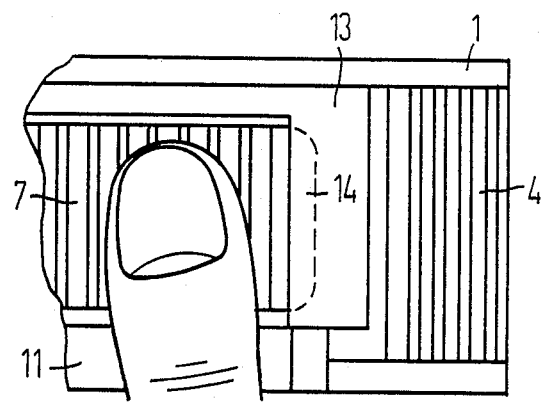
FIG. 5 shows a lateral view of the actuating area of the release lever.

FIG. 5 shows the area of the connector casing surrounding the boundary element shown in FIG. 4, which shows the outer edge of the casing 1, the ribbed gripping area 4 which locks the connector, the actuating area 7, the boundary element 13, and the recess 11. As is shown, one can easily depress with the tip of a finger the actuating area 7 underneath the casing edge and simultaneously remove the connector.

Figure 6:
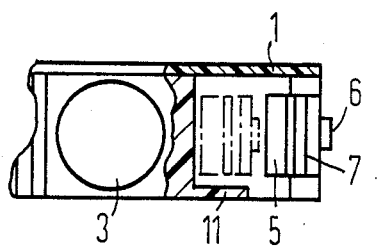
FIG. 6 shows in part a sectional view of the rear of the connector.

FIG. 6 shows in part a sectional view of the rear of the connector. This also shows the path of movement of the release lever 5. The lever 5 slides underneath the casing edge 1 into the recess 11 when lateral pressure is applied on the actuating area 7. The end position of the release lever is represented by dotted lines.

What is claimed is:

1. A connector for lightwave guides having a connector casing and connector counterparts, said casing having narrow sides and having attached at the narrow sides of the connector casing spring-loaded release levers which actuate detents which are released from a locking plate of said counterparts when lateral pressure is applied on the release levers and which are engaged with said locking plate in a plugged position of said connector casing in the connector counterparts when the connector casing is connected to said counterparts, the improvement comprising:
  said narrow sides of said connector casing having recesses therein;
  said release levers each having an actuating area inside one of said recesses;
  separate boundary elements attached to said connector casing for holding each release lever in a preloaded rest position thereby externally limiting the path of movement of the release levers when said connector casing is in an unplugged position with respect to said counterparts.

* * * * *